US011055569B2

(12) United States Patent
Revaud et al.

(10) Patent No.: US 11,055,569 B2
(45) Date of Patent: Jul. 6, 2021

(54) SYSTEMS AND METHODS FOR DETECTING A POINT OF INTEREST CHANGE USING A CONVOLUTIONAL NEURAL NETWORK

(71) Applicant: Naver Corporation, Gyeonggi-do (KR)

(72) Inventors: Jérôme Revaud, Meylan (FR); Rafael Sampaio De Rezende, Grenoble (FR)

(73) Assignee: NAVER CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/575,687

(22) Filed: Sep. 19, 2019

(65) Prior Publication Data
US 2020/0110966 A1 Apr. 9, 2020

(30) Foreign Application Priority Data
Oct. 9, 2018 (EP) .................................. 18306335

(51) Int. Cl.
*G06K 9/62* (2006.01)
*G06T 7/73* (2017.01)
(Continued)

(52) U.S. Cl.
CPC ......... *G06K 9/6256* (2013.01); *G06K 9/6215* (2013.01); *G06T 3/0093* (2013.01);
(Continued)

(58) Field of Classification Search
CPC ...... G06K 9/6256; G06K 9/6215; G06T 7/73; G06T 3/0093; G06T 5/005; G06T 5/50; G06T 2207/20084
(Continued)

(56) References Cited

U.S. PATENT DOCUMENTS

| 7,933,436 B2 | 4/2011 | Gundel et al. |
| 10,007,863 B1 | 6/2018 | Pereira et al. |

(Continued)

FOREIGN PATENT DOCUMENTS

WO WO-2016200406 A1 12/2016

OTHER PUBLICATIONS

Afifi, Mahmoud, and Khaled F. Hussain. 'MPB: A Modified Poisson Blending Technique'. *Computational Visual Media* 1, No. 4 (Dec. 1, 2015): 331-41. https://doi.org/10.1007/s41095-015-0027-z.

(Continued)

*Primary Examiner* — Ayodeji O Ayotunde

(57) ABSTRACT

A method for detecting a point of interest (POI) change in a pair of inputted POI images. A first processor of the method: generates triplets of training POI images using a base of training POI images and trains a convolutional neural network (CNN) of three-stream Siamese type based on the triplets of training POI images. A second processor of the method: computes, for each image of the pair of inputted POI images, a descriptor of that image using a stream of the CNN of three-stream Siamese type, computes a similarity score based on the descriptors of the images of the pair of inputted POI images using a similarity score function, and selectively detects the POI change based on the similarity score. A third processor of the method generates the base of training POI images to include an initial set of POI images and a set of synthetic POI images.

27 Claims, 12 Drawing Sheets
(9 of 12 Drawing Sheet(s) Filed in Color)

(51) Int. Cl.
- *G06T 3/00* (2006.01)
- *G06T 5/00* (2006.01)
- *G06T 5/50* (2006.01)

(52) U.S. Cl.
CPC .............. *G06T 5/005* (2013.01); *G06T 5/50* (2013.01); *G06T 7/73* (2017.01); *G06K 2209/01* (2013.01); *G06T 2207/20081* (2013.01); *G06T 2207/20084* (2013.01)

(58) Field of Classification Search
USPC ........................................................ 382/157
See application file for complete search history.

(56) References Cited

U.S. PATENT DOCUMENTS

| | | | |
|---|---|---|---|
| 10,037,477 B2 | 7/2018 | Cha et al. | |
| 2005/0286764 A1 | 12/2005 | Mittal et al. | |
| 2017/0061217 A1* | 3/2017 | Cha | G06K 9/6212 |
| 2017/0200264 A1* | 7/2017 | Park | G01N 21/9501 |
| 2018/0232947 A1* | 8/2018 | Nehmadi | G01S 17/931 |

OTHER PUBLICATIONS

Björklund, Tomas, et al., "Automatic License Plate Recognition with Convolutional Neural Networks Trained on Synthetic Data"; 2017 IEEE 19th International Workshop on Multimedia Signal Processing (MMSP); Oct. 2017.
Dwibedi Debidatta, et al., "Cut, Paste and Learn: Surprisingly Easy Synthesis for Instance Detection"; 2017 IEEE International Conference on Computer Vision; Oct. 2017.
Extended European Search Report for Application No. EP 18306335.3 dated Apr. 17, 2019.
Gordo, Albert, Jon Almazan, Jerome Revaud, and Diane Larlus. 'End-to-End Learning of Deep Visual Representations for Image Retrieval'. ArXiv:1610.07940 [Cs], Oct. 25, 2016. http://arxiv.org/abs/1610.07940.
Gupta, Ankush, et al., "Synthetic Data for Text Localisation in Natural Images"; 2016 IEEE Conference on Computer Vision and Pattern Recognition; Jun. 2016.
Jaderberg, Max, et al., "Synthetic Data and Artificial Neural Networks for Natural Scene Text Recognition"; Visual Geometry Group, arXIV: 1406.2227v4 [cs.CV]; Dec. 9, 2014.
Moulon, P., P. Monasse, and R. Marlet. 'Global Fusion of Relative Motions for Robust, Accurate and Scalable Structure from Motion'. In 2013 *IEEE International Conference on Computer Vision*, 3248-55, 2013. https://doi.org/10.1109/ICCV.2013.403.
Revaud, Jerome, Matthijs Douze, and Cordelia Schmid. 'Correlation-Based Burstiness for Logo Retrieval'. In *Proceedings of the 20th ACM International Conference on Multimedia—MM '12*, 965. Nara, Japan: ACM Press, 2012. https://doi.org/10.1145/2393347.2396358.
Zhang, Shun, et al., "Tracking Persons-of-Interest via Unsupervised Representation Adaptation"; arXiv:1710.02139vI [cs.CV]; Oct. 5, 2017.
Alexa, Marc, Daniel Cohen-Or, and David Levin. 'As-Rigid-as-Possible Shape Interpolation'. In Proceedings of the 27th Annual Conference on Computer Graphics and Interactive Techniques—SIGGRAPH ACM Press, 2000.
Babenko, Artem, Anton Slesarev, Alexandr Chigorin, and Victor Lempitsky. 'Neural Codes for Image Retrieval'. In Computer Vision—ECCV2014, Springer International Publishing, 2014.
Chen, Yanbei, Xiatian Zhu, and Shaogang Gong. 'Person Re-Identification by Deep Learning Multi-Scale Representations'. In 2017 IEEE International Conference on Computer Vision Workshops (ICCVW) Venice: IEEE, 2017.
Delhumeau, Jonathan, Philippe-Henri Gosselin, Nerve Jegou, and Patrick Perez. 'Revisiting the Vlad Image Representation'. In Proceedings of the 21st ACM International Conference on Multimedia Barcelona, Spain: ACM Press, 2013.
Farbman, Zeev, Gil Hoffer, Yaron Lipman, Daniel Cohen-Or, and Dani Lischinski. 'Coordinates for Instant Image Cloning'. ACM Transactions on Graphics 28, No. 3, Jul. 27, 2009.
Gordo, Albert, Jon Almazan, Jerome Revaud, and Diane Larlus. 'Deep Image Retrieval: Learning Global Representations for Image Search'. ArXiv:1604.01325 [Cs], Jul. 28, 2016.
Hoffer, Elad, and Nir Ailon. 'Deep Metric Learning Using Triplet Network'. ArXiv:1412.6622 [Cs, Stat], Dec. 4, 2018.
Perronnin, Florent ; Sanchez, Jorge, Mensink ; Thomas, 'Improving the Fisher Kernel for Large-Scale Image Classification'. In Computer Vision—ECCV 2010,—European Conference on Computer Vision, pp. 143-156, Sep 2010, Heraklion,Greece.
Jegou, Herve, and Andrew Zisserman. 'Triangulation Embedding and Democratic Aggregation for Image Search'. In 2014 IEEE Conference on Computer Vision and Pattern Recognition, Columbus, OH, USA: IEEE, 2014.
Krizhevsky, Alex, Ilya Sutskever, and Geoffrey E Hinton. 'ImageNet Classification with Deep Convolutional Neural Networks'. In Advances in Neural Information Processing Systems 25, edited by F. Pereira, C. J. C. Burges, L. Bottou, and K. Q. Weinberger, 1097-1105. Curran Associates, Inc., 2012.
Lyu, Pengyuan, Cong Yao, Wenhao Wu, Shuicheng Yan, and Xiang Bai. 'Multi-Oriented Scene Text Detection via Corner Localization and Region Segmentation'. In 2018 IEEE/CVF Conference on Computer Vision and Pattern Recognition, 7553-63. Salt Lake City, UT, USA: IEEE, 2018.
Murray, Naila, and Florent Perronnin. 'Generalized Max Pooling'. In 2014 IEEE Conference on Computer Vision and Pattern Recognition, 2473-80. Columbus, OH, USA: IEEE, 2014.
P. Perez, M Gangnet, and A. Blake. Poisson image editing. In SIGGRAPH, 2003.
Perronnin, Florent, Yan Liu, Jorge Sanchez, and Herve Poirier 'Large-Scale Image Retrieval with Compressed Fisher Vectors'. In 2010 IEEE Computer Society Conference on Computer Vision and Pattern Recognition, 3384-91. San Francisco, CA, USA: IEEE, 2010.
Schroff, Florian, Dmitry Kalenichenko, and James Philbin. 'FaceNet: A Unified Embedding for Face Recognition and Clustering'. In 2015 IEEE Conference on Computer Vision and Pattern Recognition (CVPR), 815-23. Boston, MA, USA: IEEE, 2015.
Simonyan, Karen, and Andrew Zisserman. 'Very Deep Convolutional Networks for Large-.
Scale Image Recognition'. ArXiv:1409.1556 [Cs], Apr. 10, 2015.
Song, Hyun Oh, Yu Xiang, Stefanie Jegelka, and Silvio Savarese. 'Deep Metric Learning via Lifted Structured Feature Embedding'. In 2016 IEEE Conference on Computer Vision and Pattern Recognition (CVPR), 4004-12. Las Vegas, NV, USA: IEEE, 2016.
Su, Hang, Shaogang Gong, and Xiatian Zhu. 'Scalable Deep Learning Logo Detection'. ArXiv:1803.11417 [Cs], Apr. 2, 2018.
Tolias, Giorgos, Ronan Sicre, and Hervé Jégou. 'Particular Object Retrieval With Integral Max-Pooling of CNN Activations', 2016, 13.
Turgay Celik. 'Unsupervised Change Detection in Satellite Images Using Principal Component Analysis and $k$-Means Clustering'. IEEE Geoscience and Remote Sensing Letters 6, No. 4 (Oct. 2009): 772-76.
Zhu, Jun-Yan, Philipp Krähenbühl, Eli Shechtman, and Alexei A. Efros. 'Generative Visual Manipulation on the Natural Image Manifold'. ArXiv:1609.03552 [Cs], Dec. 16, 2018.

\* cited by examiner

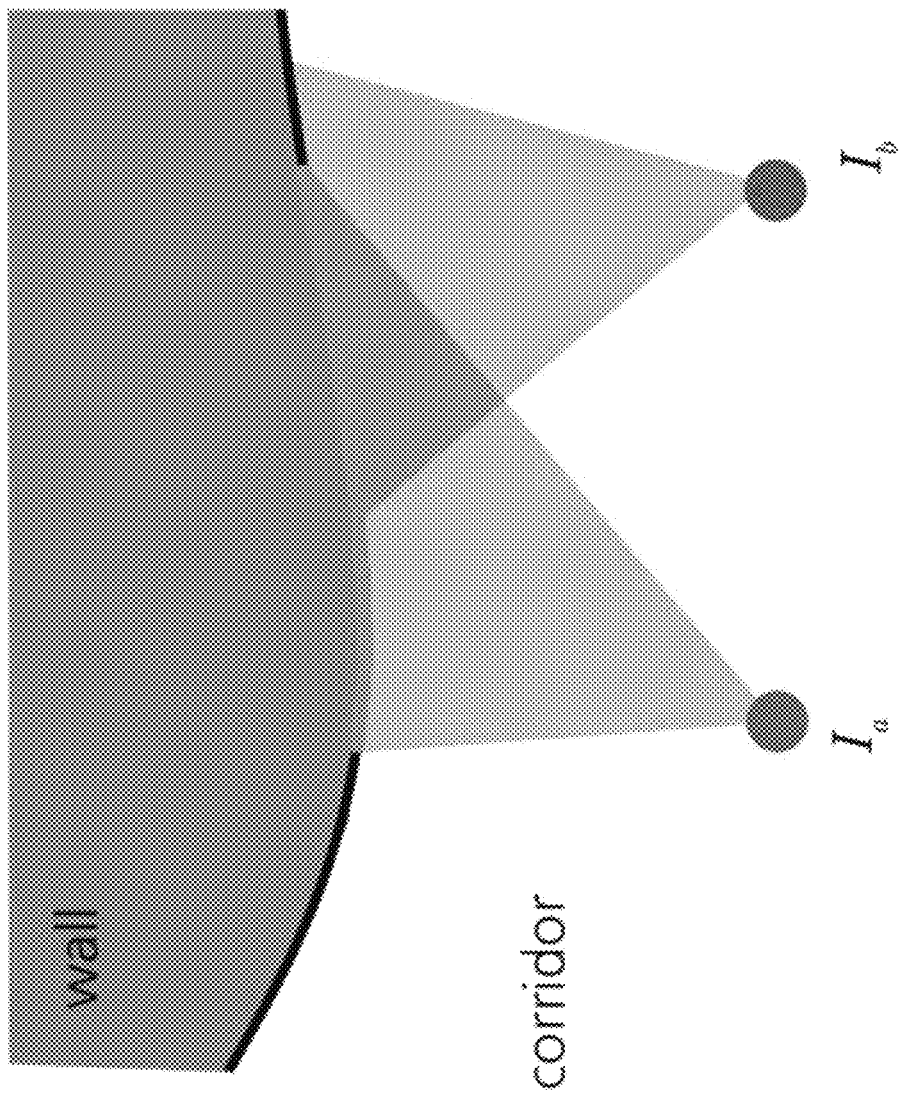

SYSTEMS AND METHODS FOR DETECTING A POINT OF INTEREST CHANGE USING A CONVOLUTIONAL NEURAL NETWORK

CROSS-REFERENCE TO RELATED APPLICATIONS

This application claims the benefit of European Application No.: 18306335.3, filed on Oct. 9, 2018. The entire disclosure of the application referenced above is incorporated herein by reference.

FIELD

The present disclosure relates to machine learning and, more particularly, to systems and methods for generating a training base, for training a convolutional neural network for detecting a change of point of interest, and for using such convolutional neural network to detect a change of point of interest.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computer vision is a recent field of endeavor which aims at providing computers with high-level understanding from digital videos.

For example, specific landmarks can be retrieved from a large photo dataset, or individuals can be identified using camera surveillance networks.

Convolutional neural networks (CNNs) can be used for computer vision. CNNs are a type of neural network (NN) wherein a connection pattern between neurons is inspired by the visual cortex of animals. CNNs may be suitable for video processing and allow for the efficient recognition of entities in images.

After a supervised learning stage where a CNN is trained by feeding it a training set of annotated images where landmarks have already been labelled, the CNN can process on based on input "fresh" images that were not in the set of images used to train the CNN.

Points of interests (POIs) may refer to well-localized geographic landmarks that someone or something (e.g., an autonomous vehicle) may find useful or interesting. Examples of POIs include shops or stores of all kinds, such as restaurants, cafes, banks, etc.

While computer vision techniques can be used to automatically recognize POIs as explained, it is also interesting to be able to perform the counterpart task of automatically determining, for each POI in a given area, whether it has changed or not over a period of time (i.e. replaced by another POI). This can be done given two datasets of geo-localized photos captured at two different time-stamps.

POI change detection is useful for mapping initiatives which could enable semi-automatic maintenance of an up-to-date database of POIs by monitoring geo-localized photos over time.

An example scenario includes a device (manned or unmanned, e.g. car, trolley, robot) capturing on a regular basis photos of the surroundings in a specific area, for example, using a 360-degree camera and spanning the area. The capturing device would have some localization abilities (e.g., a LIDAR) that would enable associating each photo with a 6-degrees-of-freedom (6DoF) pose. Alternatively, the 6DoF image poses could be recovered using automatic three dimensional (3D) reconstruction techniques.

"Ranking-based" approaches may be able to identify whether two instances are the same (or equivalently, different). However, detecting changes in POI is challenging due to the fact that the appearance of POIs can vary tremendously as time passes. The appearance of a POI may change, for example, due to weather/lighting conditions, viewpoint changes, occlusions (by cars, trees, people, etc.), seasonal changes of frontage (Christmas, special sales), etc. It is also difficult to gather actual examples of POI changes for training.

POI change detection can be performed for satellite imaging or medical imaging where anchor images may be used to which all candidate images can be compared. This is not possible, however, for POIs images.

There is a need for systems and methods for detecting POI changes reliably and without restriction.

SUMMARY

For these purposes, the present application provides according to a feature, a method for generating a base of training images for training a convolutional neural network (CNN) for detecting a Point Of Interest (POI) change in a pair of inputted POI images. The method includes, by a data processor of a first server: (a1) obtaining an initial set of labelled POI images; (a2) for each image from a subset of the initial set, identifying a signage region in the image, the signage region depicting a key visual feature of a POI depicted by the image; (a3) generating at least one synthetic POI image corresponding to a first image of the subset wherein the signage region has been replaced by that of a second image of the subset, and associating to the synthetic POI image the label of the second image; (a4) providing as the base of training images a final set of POI images including the initial set of POI images and each generated synthetic POI image.

Additional features of the present application are as follow: (a2) includes obtaining a collection of cropped signage images, and (a3) includes replacing the signage region of the given image using a randomly chosen cropped signage images from the collection of cropped signage images; (a3) includes affine warping of the chosen cropped signage image for adaptation to size and shape of the signage region of the given image, and then Poisson blending; the key visual feature of a POI is a name and/or a logo of the POI, the signage region being identified in an image at (a2) using Optical Character Recognition and/or logo detection; either each POI image is associated to a label identifying the POI depicted by the image, or each POI image is associated to a label defining a position and/or an orientation of the image, possibly a 6-degrees-of-freedom pose of the image; each POI image is associated to a label defining a 6-degrees-of-freedom pose of the image, (a1) including generating the initial set of POI images by acquiring geo-localized photographs of POIs using an image acquisition device.

In a feature, the present application provides a method for training a convolutional neural network (CNN) for detecting a point of interest (POI) change in a pair of inputted POI images. The method includes: generating, by a data processor of a first server, a base of training images; generating, by a data processor of a second server, a plurality of triplets of training images, each triplet including a pair of related POI images, and a pair of unrelated POI images, two POI images being determined as related or not on the basis of their labels; training, by the data processor of the second server, from the plurality of triplets, a CNN of the three-stream Siamese type.

Additional features are as follow: each POI image is associated to a label defining a 6-degrees-of-freedom pose of the image, two POI images being determined as related if they present a geometric overlap over a first threshold and as non-related if they present a geometric overlap below a second threshold, based on their respective 6-degrees-of-freedom pose; the geometric overlap between two images is computed as the intersection-over-union between sets of corridor outlines respectively visible in each of the two images; at least one triplet includes as a pair of unrelated POI images a synthetic image and the first image from which the synthetic image has been generated.

In a feature, the present application provides a method for detecting a point of interest (POI) change in a pair of inputted POI images. The method includes: training, by a data processor of a second server, a CNN of the three-stream Siamese type; computing, by the data processor of the third server, for each image of the pair of inputted POI images, a descriptor of the image using a stream of the CNN; detecting, by the data processor of the third server, a POI change based on a similarity score function of the descriptors computed.

Additional features are as follow: the images of a pair of inputted POI images have been captured at the same location at two different time stamps; the method is performed for a plurality of pair of inputted images, obtained from two given datasets of geolocated images captured at two different time stamps, over a given area.

According further features, the present application provides a computer program product, including code instructions for executing a method according to the above for generating a base of training images, for training a convolutional neural network (CNN) or for detecting a point of interest (POI) change in a pair of inputted POI images; and a computer-readable medium, on which is stored a computer program product including code instructions for executing a method according to the first, second or third aspect for generating a base of training images, for training a convolutional neural network (CNN) or for detecting a point of interest (POI) change in a pair of inputted POI images.

In a feature, a method for detecting a point of interest (POI) change in a pair of inputted POI images includes: by a first processor, training a convolutional neural network (CNN) of three-stream Siamese type based on triplets of training POI images; by a second processor, computing, for each image of the pair of inputted POI images, a descriptor of that image using a stream of the CNN of three-stream Siamese type; by the second processor, computing a similarity score based on the descriptors of the images of the pair of inputted POI images using a similarity score function; and by the second processor, selectively detecting the POI change based on the similarity score.

In further features, selectively detecting the POI change includes, by the second processor, detecting the POI change when the similarity score is greater than a threshold value.

In further features, selectively detecting the POI change includes, by the second processor, not detecting the POI change when the similarity score is less than the threshold value.

In further features, the images of a pair of inputted POI images are captured at the same location at two different times.

In further features, the training a CNN of three-stream Siamese type based on triplets of training POI images further includes: by a third processor, generating a base of training POI images; by the first processor, generating a plurality of triplets of training POI images using the base of training POI images, each triplet including a first training POI image, a second training POI image that is related to the first training POI image, and a third POI training image that is unrelated to the first and second training POI images; by the first processor, determining whether training POI images are related or unrelated based on labels associated with the training POI images, respectively; and by the first processor, training a CNN of three-stream Siamese type based on the triplets of training POI images.

In further features, the labels each include a 6-degrees-of-freedom pose of the associated training POI image.

In further features, determining whether the training POI images are related or unrelated includes: by the first processor, determining that two training POI images are related when the two training POI images present a geometric overlap greater than a third threshold value; and by the first processor, determining that the two training POI images are unrelated when the geometric overlap is less than a second threshold value.

In further features, the method further includes, by the first processor, computing the geometric overlap between the two training POI images based on the intersection-over-union between sets of corridor outlines respectively visible in each of the two POI images.

In further features, at least one triplet includes a synthetic POI image generated by replacing a first signage region of a first training image with a second signage region from another training POI image.

In further features, the generating a base of training POI images further includes: by the third processor, obtaining an initial set of POI images having associated labels, respectively; by the third processor, for each POI image in a subset of the initial set, identifying a signage region in that POI image, the signage region including signage located on a POI depicted by the POI image; by the third processor, generating a synthetic POI image corresponding to a first POI image of the subset by replacing the signage region of the first POI image with the signage region of a second POI image; by the third processor, associating to the synthetic POI image the label of the second POI image; and storing, as the base of training POI images, a final set of POI images including the initial set of POI images and the synthetic POI image.

In further features, the method further includes: by the third processor, generating a second synthetic POI image corresponding to a third POI image of the subset by replacing the signage region of the third POI image with the signage region of a fourth POI image; and by the third processor, associating to the synthetic POI image the label of the fourth POI image, where the storing further includes storing the second synthetic POI image in the final set.

In further features, at least 5 percent of a total number of POI images in the final set are synthetic POI images generated with signage regions from other POI images.

In further features, at least 25 percent of a total number of POI images in the final set are synthetic POI images generated with signage regions from other POI images.

In further features, the method further includes: obtaining a collection of cropped signage images, where generating the synthetic POI image includes replacing the signage region of the first POI image with the cropped signage image of a chosen one of the cropped signage images from the collection of cropped signage images.

In further features, the method further includes randomly choosing the chosen one of the cropped signage images from the collection of cropped signage images.

In further features, the method further includes performing affine warping of the chosen one of the copped signage images for adaptation to size and shape of the signage region of the first POI image.

In further features, the method further includes performing Poisson blending.

In further features, the signage includes at least one of (a) a name located on the POI depicted by the POI image and (b) a logo located on the POI depicted by the POI image.

In further features, identifying the signage region in each of the POI image includes identifying the signage region in each of the POI images using at least one of optical character recognition and logo detection.

In further features, the labels associated with the POI images each include a label identifying the POI depicted by that one of the POI images.

In further features, the labels associated with the POI images each include a label defining at least one of a position and an orientation of that one of the POI images.

In further features, the labels associated with the POI images each include a label defining a 6-degrees-of-freedom pose of that one of the POI images.

In further features, the method further includes generating the initial set of POI images by acquiring geo-localized images of POIs using an image acquisition device.

In further features, the subset includes all of the initial set.

In a feature, a method for generating a base of training images for training a convolutional neural network (CNN) for detecting a point of interest (POI) change in a pair of inputted POI images includes: by a processor, obtaining an initial set of POI images having associated labels, respectively; by the processor, for each POI image in a subset of the initial set, identifying a signage region in that POI image, the signage region including signage located on a POI depicted by the POI image; by the processor, generating a synthetic POI image corresponding to a first POI image of the subset by replacing the signage region of the first POI image with the signage region of a second POI image; by the processor, associating to the synthetic POI image the label of the second POI image; and storing, as the base of training images, a final set of POI images including the initial set of POI images and the synthetic POI image.

In a feature, a method for training a convolutional neural network (CNN) for detecting a point of interest (POI) change in a pair of inputted POI images includes: by a first processor, generating a base of training POI images; by a second processor, generating a plurality of triplets of training POI images, each triplet including a first POI image, a second POI image that is related to the first POI image, and a third POI image that is unrelated to the first and second POI images; by the second processor, determining whether POI images are related or unrelated based on labels associated with the POI images, respectively; and by the second processor, training a CNN of three-stream Siamese type based on the triplets of training POI images.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more fully understood from the detailed description and the accompanying drawings, wherein:

FIG. 6 illustrates how a geometric overlap is computed between two images;

In the drawings, reference numbers may be reused to identify similar and/or identical elements.

DETAILED DESCRIPTION

Architecture

Figure 1:
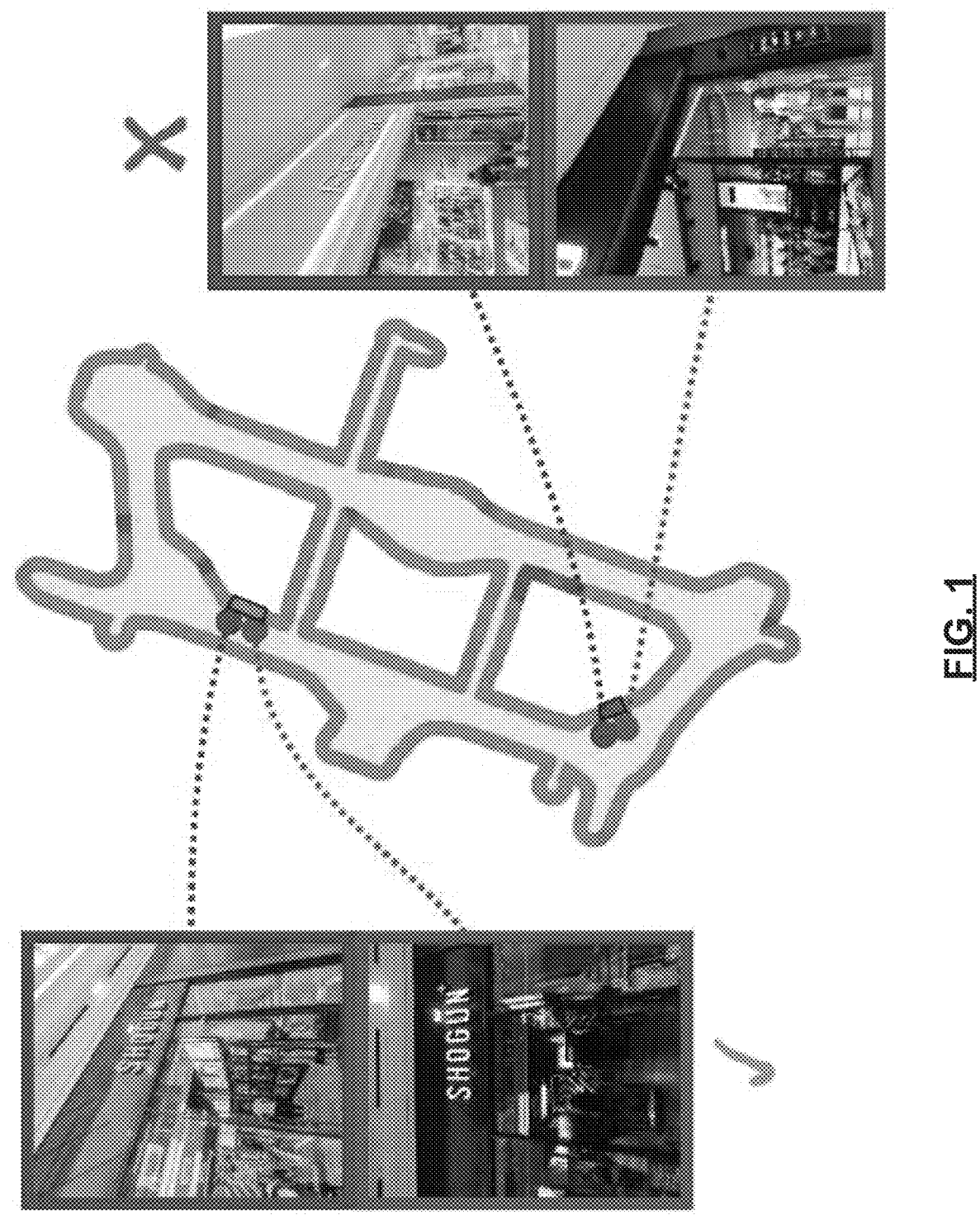
FIG. 1 represents examples of comparisons of POI images showing a change of POI or not.

The present application describes: a method for generating a base of training images for training a convolutional neural network (CNN) for detecting a point of interest (POI) change in a pair of inputted POI images; a method for training a CNN for detecting a POI change in a pair of inputted POI images, advantageously from a base generated according to the first method; a method for detecting a POI change in a pair of inputted POI images using a CNN advantageously trained according to the second method.

As explained, "Point Of Interest" may mean a well-localized geographic landmark that someone or something may find useful or interesting. Typical examples of POIs are shops or stores of all kinds, such as restaurants, cafes, banks, etc. However, POIs can be generalized to any occupancy of any premises. Further examples of POIs include public buildings, hospitals, schools, churches, parking lots, police stations, fire stations, train stations, airports, etc.

Generally speaking, POIs are "spots" that can be marked in a map, such as a "web map." A web map may be a map provided on client equipment 10 such as a mobile device (e.g., smartphone, tablet, laptop, etc.) or an embedded or less mobile device (e.g., a car computer, a desktop, a display or projection unit, etc.) using an application. Web maps can be generated from a database of POIs for displaying on the map based on user requests.

Depending on the context a POI is used, a POI may identify features that may or may not be of interest (e.g., when traveling, the following POIs may be of interest: refueling stations, car parks, restaurants, etc.), whether appearing outside a structure (e.g., a tourist attraction, government buildings, etc.) or inside a structure (e.g., POIs may identify the location of art within a museum or the location of facilities). Thus, POIs may have different meanings in different contexts.

Each POI is as explained associated to a particular location (typically a building), so that an image of this location depicts the POI.

A "POI change" may refer to the replacement of a POI at a particular location by another POI (regardless of the reason) during a given period defined by a pair of inputted images.

These images capture the same location at two different time-stamps (thereby defining the time period) and are respectively denoted as a "before-image" and an "after-image". For instance, if at the same location the before-image depicts a bank while the after-image depicts a fast food restaurant, there is a POI change from bank to restaurant.

The present application describes a method of detecting the occurrence of a POI change. The output of a method may be a Boolean value, for example a first value when a POI change is detected and a second value when a POI change is not detected. If a POI change has been detected, a POI detector could be triggered to determine the "new" POI.

The described method can be used at a large scale for automatically determining, for each POI in a given area, if that POI has changed or not over the period of time. In other words, the POI change detection method can be performed for a plurality of pair of inputted images, obtained from two given datasets of photos (images) taken at approximately the same geolocations (geolocated photos). The two datasets may be captured, for example, by a vehicle roaming the area. The two datasets are captured at two different times (and have two different time-stamps) and are respectively denoted as a "before-dataset" (a set of "before-images") and an "after-dataset" (a set of "after-images").

In the example of FIG. 1, the map represents an area, where two locations are checked for POI change. On the left, it can be seen that there is no POI change at a first location (as indicated by the check mark). On the right it can be seen that there is a POI change at a second location (as indicated by the X).

Figure 2:
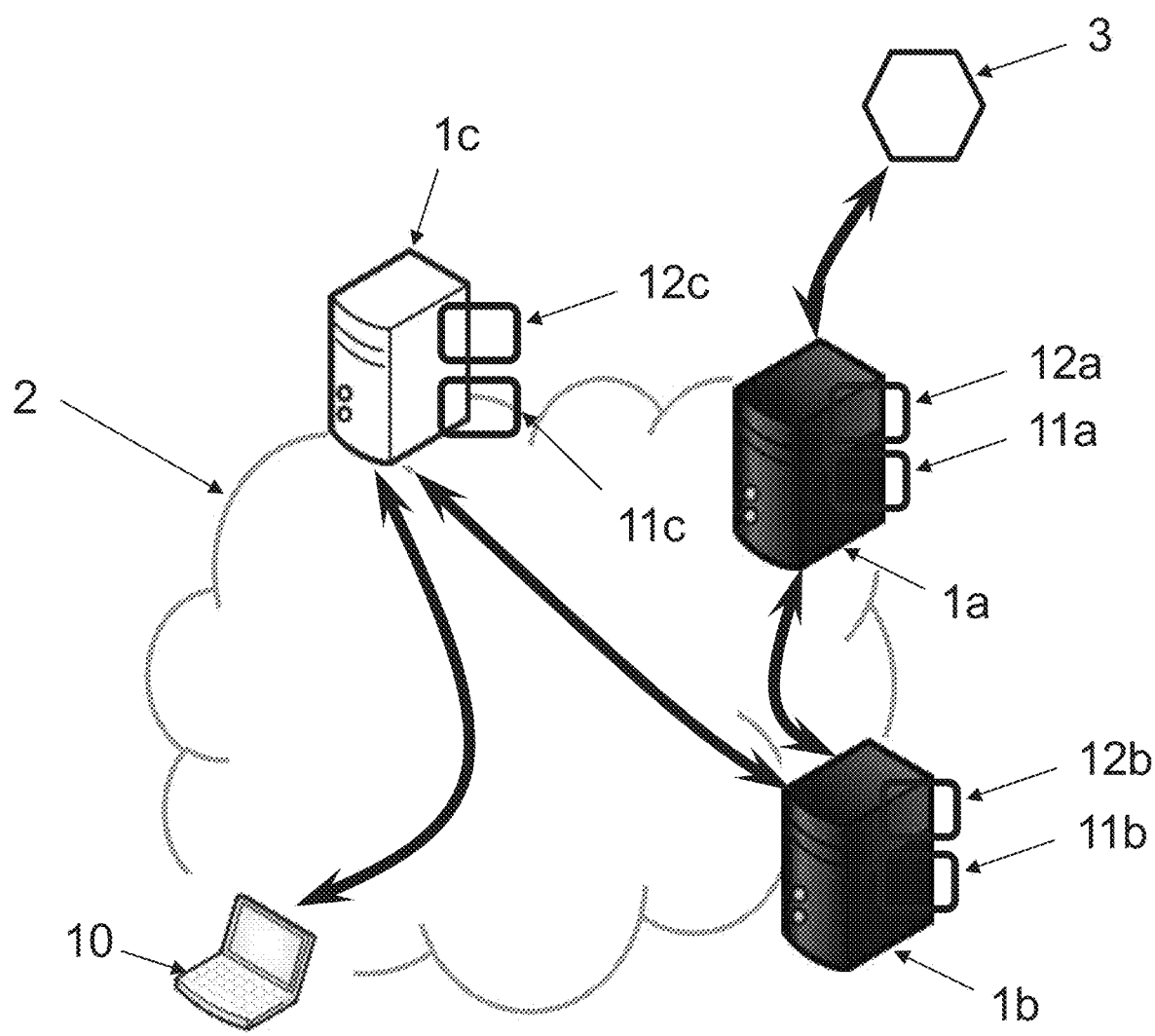
FIG. 2 illustrates an example of architecture in which a method is performed.

The described methods are implemented within an architecture such as illustrated in FIG. 2, using a first server and/or a second server and/or a third server 1a, 1b, 1c. The first server 1a is a base generation server (implementing a first method), the second server 1b is a learning server (implementing a second method) and the third server 1c is a POI change detection server (implementing a third method). The functionality of two (e.g., the first server 1a and the second server 1b) or all the servers can be combined. Alternatively, the functionality of each of the servers may be provided by a processor circuit or if combined by a shared processor circuit.

Each of the first, second, and third servers 1a, 1b, 1c includes remote computer equipment connected to an extended network 2, such as the Internet for data exchange. Each of the first, second, and third servers 1a, 1b, 1c includes a data processing module 11a, 11b, 11c, such as a data processor. The data processing module 11b of the second server 1b may have greater data processing abilities than the data processing modules 11a and 11c as learning may be more computationally intensive than the functionality of the data processing modules 11a and 11c. Each of the first, second, and third servers 1a, 1b, and 1c may also include storage modules 12a, 12b, 12c, such as memory.

The first and second servers 1a and 1b store or have access to a training base. The training base may include a base of training images, which may be referred to as "POI images". Each POI image is associated to a label (or a "tag") which allows the first and second servers 1a and 1b to determine if two of the POI images are "related" or "unrelated". Related may mean likely to depict the same POI. Unrelated may mean unlikely to depict the same POI.

In a first example, the label directly identifies a POI depicted by the POI image. In other words, it may be known for each POI image of the training base which POI is depicted by this image. For example, an image of a restaurant can be associated with a label which is the name of the restaurant.

In a second example, each POI image is labelled with position and/or orientation data. In this example, the label of a POI image defines a position and/or an orientation of the POI image. For example, the label may include a 6D pose including 3 components of the position and 3 components of the orientation. In such a case, two POI images may be determined to be related if their position/orientation (labels) are approximately the same (e.g., if the camera has a similar viewpoint when acquiring the images).

The present application is not limited to a particular labelling scheme. The labels could be of any suitable nature as long as the labels provide information about the depicted POI and allow the servers 1a, 1b, and 1c to determine whether two POI images are related or not.

The architecture may further include: an image acquisition device 3, such as a car with a camera and a geolocation unit (such as a GPS module, a LIDAR, etc.) configured to determine the position (e.g., 3 components) and/or the orientation (e.g., 3 components) of each acquired image, such as a six degrees of freedom (6D pose).

One or more items of client equipment 10, which may be a user terminal (also connected to the network 2), and may be separate from the servers 1a, 1b, 1c, but may being merged with one and/or the other thereof, for accessing the POI information. For example, the client equipment 10 may implement a mapping application displaying POIs on a map based on POI information from one or more of the servers 1a, 1b, and 1c.

Siamese NN

In an example involving store fronts, a POI change is first detected in images and then recognition of the franchise they belong to is detected. For example, a POI change may be detected if the franchise has changed. The present application does not require any POI detector nor any explicit knowledge about POI franchises. In other words, the present application can detect a POI change of a storefront even if the corresponding franchises (before and after) have never been seen during training.

The POI change detection problem can be described as including a ranking problem. A ranking approach aims to predict, given an input query, the rank of the all database elements with respect to this query in term of similarity. The similarity is typically defined according to the task at hand (e.g., arbitrarily).

The similarity may be learned from example pairs of similar/dissimilar instances (an instance being a POI in the present case). While ranking approaches only seem to solve the "identification" problem and find instances most similar to the query in the dataset, ranking approaches can be used to verify the similarity of two instances and check whether the two instances are similar or not. If the two instances are not similar while they were supposed to be, then there is a change.

One way of training a ranking system is using a triplet loss. The present application includes a particular form of ranking loss based on image triplets. The goal is to explicitly enforce that, given a triplet composed of a query image, a "relevant" image (an image related to the query image, i.e.

of the same instance), and an "irrelevant" image (i.e. an image unrelated to the query image), the trained representation of the relevant image is closer to the representation of the query image than the representation of the irrelevant image.

To rephrase in the context of POIs, there is no change if, given a triplet composed of an after-image, a before-image, and image of another POI (e.g., a random POI image associated with a label that is incompatible/unrelated with the label of the before-image, i.e., unrelated and depicting another different POI), the trained representation of the after-image image is closer to the representation of the before-image than the representation of the image of another POI.

Figure 3:
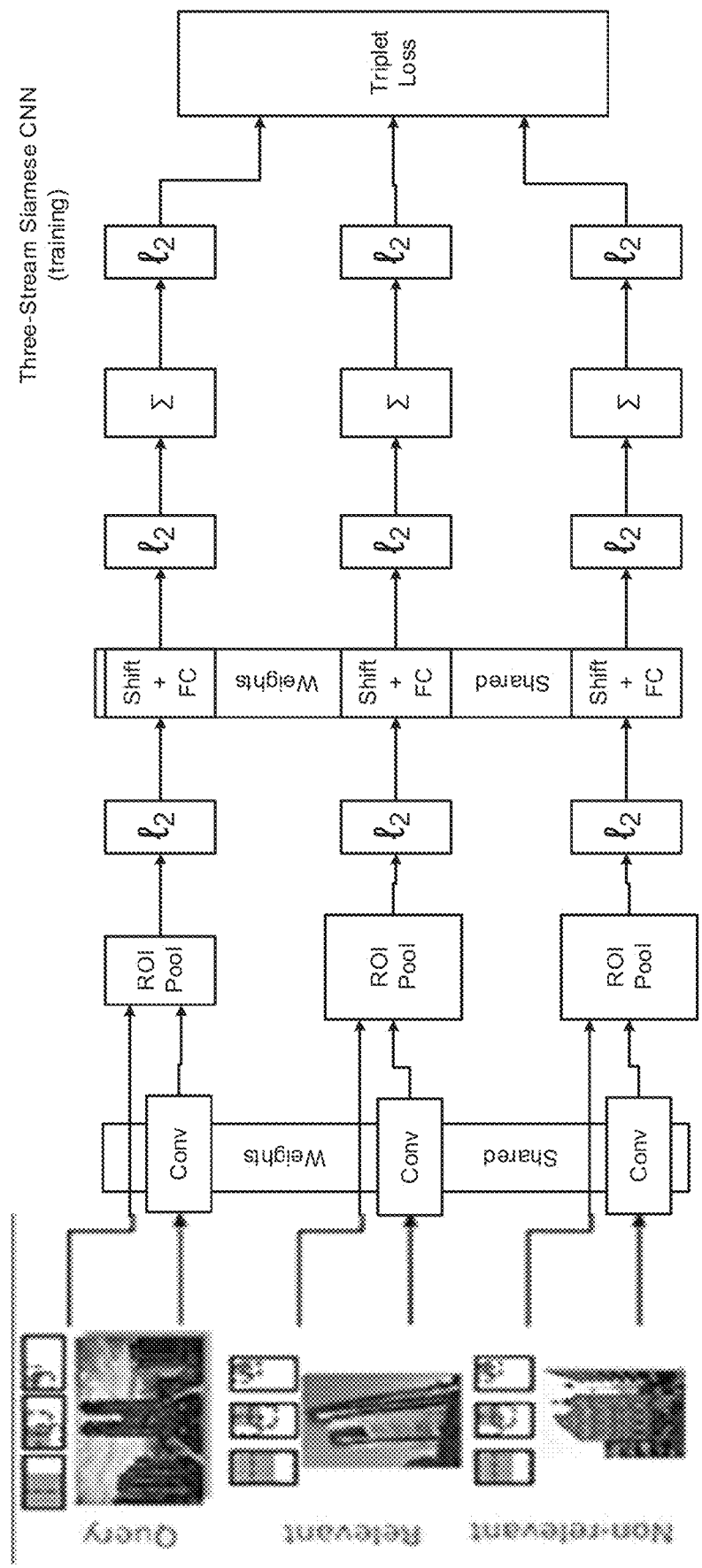
FIG. 3 represents an example of a CNN architecture for use in the method.

To that aim, the CNN of the present application may be a three-stream Siamese neural network. The image representation produced by each of the three streams are jointly considered by the loss. An embodiment of such Siamese NN for POI change detection is represented by FIG. 3.

A "Siamese" NN is a type of neural network architecture that contains two or more identical subnetworks, called the streams. FIG. 3 shows an example with three streams. "Identical" may mean having the same configuration with the same parameters and weights. Parameter updating may be mirrored across all streams.

The weights of the convolutional filters (layer CONV) and of the fully-connected layer (FC) are shared between the streams as their size is independent of the size of the images. This means that the Siamese architecture can process images of any sizes and aspect ratios, and can be trained using images at the same (high) resolution that is used at test time.

A typical ResNet-101 can be used as a backbone of each stream with a global pooling layer based on generalized maxpooling.

The FC layer outputs a "descriptor". The descriptor may be a representation vector on the basis of which two inputs can be compared. As the streams have the same configuration, given an input the descriptor obtained is the same for each stream.

A portion (e.g., layer) of the Siamese NN after the FC layers computes a loss and used only during training. The following ranking loss can be used for training. Let $I_q$ be a query image with descriptor $d_q$, $I_+$ be a relevant image with descriptor $d_+$, and $I_-$ be an irrelevant image with descriptor $d_-$. The ranking triplet loss is thus defined as $$L(I_q, I_+, I_-) = \max(0, m + \|d_q - d_+\|^2 - \|d_q - d_-\|^2),$$

where m is a scalar that controls the margin.

While the example of ranking triplet loss is discussed, other loss functions could be used, such as distance functions other than L2 norm.

The three-stream Siamese NN can be trained with triplets $I_a$, $I_b$, $I_c$ where $I_a$ and $I_b$ shows the same instance (i.e., depicting the same POI) and $I_c$ shows a different instance (i.e., depicting a different POI). The following formula for triplet loss enforces the fact that, whatever the instance is, the distance between descriptors $d_a$ and $d_b$ must always be less than the distance between $d_a$ and $d_c$. If this relation holds for any triplet, it means that in general images from the same instance are closer in space than images from different instances. In other words, measuring the distance between two image descriptors tells about the relation between the two instances:

$$\text{change}(I_a, I_a) = \begin{cases} \text{no if } \|d_a - d_b\| \leq \tau \\ \text{yes otherwise} \end{cases},$$

where $\tau$ is a predetermined threshold (see below).

Base Generation Method

A method for generating a base of training images is implemented by the data processor 11a of the first server 1a. The method sets the training base for training the CNN (in particular of the three-stream Siamese type NN).

The general setup to train a Siamese NN is to create a dataset of images with a single instance per image (i.e. each image depicting a single POI) and having an associated label. As previously mentioned: each label identifies the POI depicted by the image. Generating triplets is as follows. Let the label of an image $I_a$ be denoted as $I_a$. To generate a triplet $(I_a, I_b, I_c)$, enforce that $I_a = I_b$ and $I_a \neq I_c$.

Training a network for POI change detection could use a large dataset of actual pairs of POI images, among which some with have POI changes and some do not have POI changes. The training would randomly sample the dataset to form proper triplets. Gathering such a large dataset, however, may be difficult, time consuming, and costly.

Directly generating triplets $(I_a, I_b, I_c)$ simulating POI change and no POI change pairs may have flaws. For example, the (trained) NN may be unable to learn sufficient invariance against visual clutter that is not a change, such as weather, occlusions, or seasonal store-fronts changes. This may be due to the limited data used for training that may not represent the full panel of possible variations. The limited dataset may only simulate example pairs of POI changes. Also, instead of providing an example pair of images of the same place illustrating an actual POI change, two different POIs from two different places may be used. In reality, however, there is often a certain similarity or correlation between the POI "before" and the one "after", as shown on the right side of FIG. 1.

The present application discriminates between what constitutes the visual identity of an instance. This may be referred to as the "key visual feature". In the case of POIs, different shops can sell the same products or services, so the store-front itself is not so discriminative. In particular, the only thing that can unequivocally differentiate two different POIs is this key visual feature, which is typically a name and/or a logo of the POI. In various implementations, other visual identity features can be used, such as a tridimensional emblem, a particular pattern, specific furniture, etc. Such a key visual feature of a POI is usually well identified in the image and can be isolated.

Figure 4A:
FIG. 4a represents an example of actual POI change that is particularly hard to detect.

For example, FIG. 4a shows an example of an actual POI change that may be difficult for a trained NN to detect. The shop owner (franchise) has changed, but the store content stayed the same. Only the key visual feature (the signage) has changed, but not in a relatively distinctive way.

The key visual feature as appearing on POI images of store fronts is called the "signage", and the corresponding part of the POI image is referred to as the "signage region". Example signage regions are defined by the dashed rectangles in FIG. 4a.

The present application involves generation of artificial examples of POI changes by synthetically swapping the signage region with another signage region and, optionally, using image blending techniques for more realism, so as to augment the training base.

Figure 8:
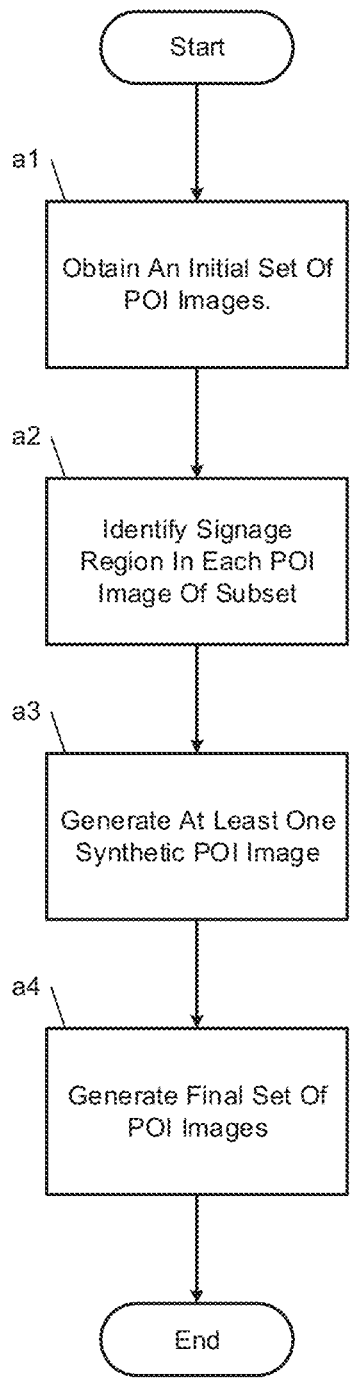
FIG. 8 includes a flowchart depicting an example method of generating a set of images for training.

The base generating method is illustrated in FIG. 8 and starts with a step (a1) of obtaining an initial set of POI images, each of the POI images having a stored associated label. The label could either directly identify a POI depicted by the image, or define a position and/or an orientation of the image. Both embodiments will be explained in the following. However, various techniques can be used to obtain the initial set.

If the labels identify the POIs, it is assumed that at this point each image of the initial set depicts a single POI which is correctly labelled.

In a step (a2), for each image from a subset of the initial set, a signage region is identified in the image, the signage region depicting as explained a key visual feature of a POI depicted by the image—in particular identified by the label associated to the image—typically a name and/or a logo. The subset may be the entire initial set or include less than the entire initial set. The signage region can be identified in an image for instance using Optical Character Recognition and/or logo detection.

When the signage region is identified, the signage region can be cropped so as to obtain a "signage image", that is a small image limited to the signage region. It to be noted that this step (a2) may include obtaining a collection of cropped signage images from the different images.

In a step (a3) at least one "synthetic" POI image is generated. The synthetic POI image is an artificial, made-up, training image corresponding to a first image of the subset where the signage region has been replaced by the signage region of a second image of the subset. In other words, given a genuine POI image (the first image), the signage region of this image is replaced by another signage region (that of a second image). The second image (from which the other signage region is obtained) may be chosen randomly from the subset.

Step (a3) may include affine warping of the chosen cropped signage image for adaptation to size and shape of the signage region of the given image. This may be followed by Poisson blending for more realism.

Figure 4B:
FIG. 4b represents examples of synthetic POI images and the corresponding original POI images.

Examples of generated synthetic POI images are shown in FIG. 4*b*. For each example, the left image is the original one (the first image) including the original signage region, the image above illustrates the cropped signage region chosen (from the second image), and the right image is the synthetic POI image obtained by swapping the signage region of the first image with the signage region of the second image.

For use in training, the synthetic POI image is labeled, i.e. associated with the label of the second image. The synthetic image is considered as depicting the POI of the cropped signage region.

The original image and the synthetic image constitute a new dissimilar (unrelated) pair that is added to the training base.

In step (a4), a final set of POI images including the initial set of POI images and each generated synthetic POI image is provided as the base of training images. The training is performed on the base of training images.

This process can be executed multiple times for each POI image having visible signage. Synthetic data generation allows injecting a-priori knowledge in a simple way, making the approach robust to scarce data.

As discussed further below, advantageous results are obtained with up to 50% of synthetic images in the training base (i.e., up to one POI synthetic image per original POI image). The rate of synthetic POI images in the training base can range from 4% (and 96% original POI images) to 80% (and 20% original POI images). In various implementations, the training base may include 10% to 70% synthetic POI images with the remainder being original POI images. In various implementations, the training base may include 20% to 60% synthetic POI images with the remainder being original POI images. In various implementations, the training base may include 40% to 55% synthetic POI images with the remainder being original POI images.

POI Image Labelling

In the first example discussed above, each POI image is associated with a label identifying the POI. In such a case, step (a1) can be performed by manually labelling captured POI images. Manually labeling captured POI images, however, may be time and resource consuming.

Figure 5A:
FIGS. 5a-5c represent three examples of problematic candidate POI images.
Figure 5B:
Figure 5C:

Automatically collecting and labelling images could be performed. However, "µl-formed triplets" may occur. The reason may be three-fold: (1) more than one instance may appear on an image, for example, as shown in FIG. 5*a*; (2) a single image can cover only part of a POI, hence two images from the same POI can share no overlap whatsoever, for example, as shown in FIG. 5*b*; (3) some images may not include a POI at all, yet a POI image paired with such image does not count as a change, such as illustrated in FIG. 5*c*.

For accuracy of the labels identifying the POI depicted in each POI image, human review and verification of the labels and the POI images may be performed. Human verification that each POI image also includes only a single POI may also be performed.

In the second example, each POI image is labelled with position and/or orientation data, such as a 6D pose. In this example, triplets may be generated based on a geometrical measure of image content overlap: two images are related, if they share a substantially common view, i.e. if they present an overlap.

Assumed that a map of the area is available, the map may show (e.g., only) the outline of corridors, such as shown in the example of FIG. 1. If the map is unavailable, poses and a map could be obtained using 3D reconstruction techniques.

A point belonging to the corridor outlines is denoted as $w \in W$, where W is the set of all such points, such as illustrated in the example of FIG. 6. For each image $I_a$, a geometric parameter $V_a$ that represents the set of corridor outlines $w \in V_a$ visible in this image can be computed. This is achieved via ray-casting: for each pixel of the image, is casted a 3D ray that starts from the camera lens, pass through this pixel and hit the first $w \in W$ it encounters on its way.

The overlap $0(I_a; I_b)$ between two images $I_a$ and $I_b$ can be computed using the intersection-over-union between their visibility sets:

$$0(I_a; I_b) = \frac{V_a \cap V_b}{V_a \cup V_b}.$$

Deciding if two images are related or not is then based on their geometric overlap: two POI images are determined as related (true pair) if they present a geometric overlap over a first threshold ($0(I_a; I_b) > \tau_{high}$) and as non-related (false pair) if they present a geometric overlap below a second threshold ($0(I_a; I_b) \leq \tau_{low}$).

The first threshold $\tau_{high}$ is greater than or equal to the second threshold $\tau_{low}$. Example values are $\tau_{high}=0.5$ (i.e. 50% of overlap) and $\tau_{low}=0$ (no overlap, i.e. the two images are distinct). If the geometric overlap between two images is between the thresholds ($\tau_{high} \geq 0(I_a; I_b) > \tau_{low}$), the relationship between the two images may be indicated as being uncertain (not related and not unrelated). Two images with an uncertain relationship will not be used in the same triplet.

Training Method

Figure 9:
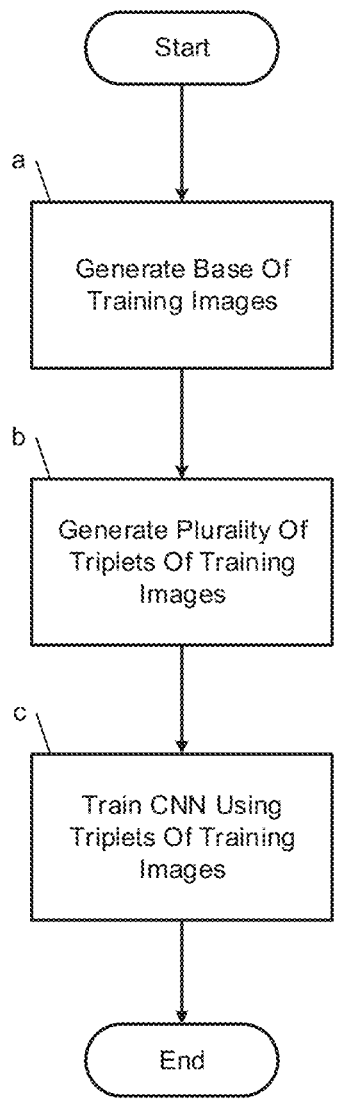
FIG. 9 includes a flowchart depicting an example training method.

A training method is implemented by the data processor 11*b* of the second server 1*b* and is illustrated in FIG. 9. The training method trains the CNN of the three-stream Siamese type, for detecting a POI change.

In a first step (a), the base of training images is generated pursuant to the first example discussed above (i.e., where each POI image is associated with a label identifying the POI) with reference to FIG. 8, so as to be "augmented" with the synthetic POI images.

Either the first and the second server 1*b* and 1*c* may be the same server, or step (a) may include the transmission of the training base from the first server 1*a* to the second server 1*b*, for storage in the memory 12*b*.

In a second step (b), a plurality of triplets of training images are generated using the base of training images. Each triplet includes a pair of related POI images and an unrelated POI image. In other words, each triplet includes two related POI images and a third POI image which is unrelated to the two other POI images. In other words, there are three images in a triplet. The third image of the triplet is unrelated to the first image or the second image of the triplet (which are related). That is, if $I_c$ is the "unrelated image" of the triplet $(I_a, I_b, I_c)$, $I_a$ belongs to both pairs $(I_a, I_b)$—the pair of related images—and $(I_a, I_c)$—the pair of unrelated images—of the triplet). Two POI images are determined as related or not on the basis of their labels. At least one triplet may include a pair of unrelated POI images a synthetic image and the first image from which the synthetic image has been generated. The triplets can be generated randomly, for example, once the pairings are made.

If the labels identify the POIs themselves, two POI images may be identified as being related if the two POI images have the same label. If each POI image is associated to a label defining a 6-degrees-of-freedom pose of the image, two POI images may be identified as related or not as a function of their geometric overlap, based on their respective 6-degrees-of-freedom pose.

Step (b) may include computing the geometric overlap between all image pairs within the base, so as to select triplets respecting the geometric overlap constraints to simulate the POI change and no POI change pairs.

In the 6DoF example, the training base may be free of actual POI changes to provide better training. If not, the training base could include a pair of POI images with the same pose but depicting different POIs. POI changes happen infrequently. This is even more true where the POI images are collected at time-stamps close in time or in one session.

In a third step (c), the Siamese NN is trained using the three images of the triplets as inputs of the three streams and using the "ranking triplet loss" as the loss function. The following may be used for the training: a learning rate of $10^{-5}$ divided by two every 2000 iterations with Adam, a batch size of 16 and performed hard triplet mining every 32 iterations. During hard triplet mining, a pool of 512 images may be randomly sampled.

Data augmentation techniques (e.g., random scaling, color jittering, random rotation, random tilting, random erasing, random crop) can be used with the same parameters for all experiments.

Training a model until convergence may require a few thousands of iterations, after which the triplet loss becomes null for all training triplets. Once the triplet loss is null, further training may be ineffective.

POI Change Detection Method

Figure 10:
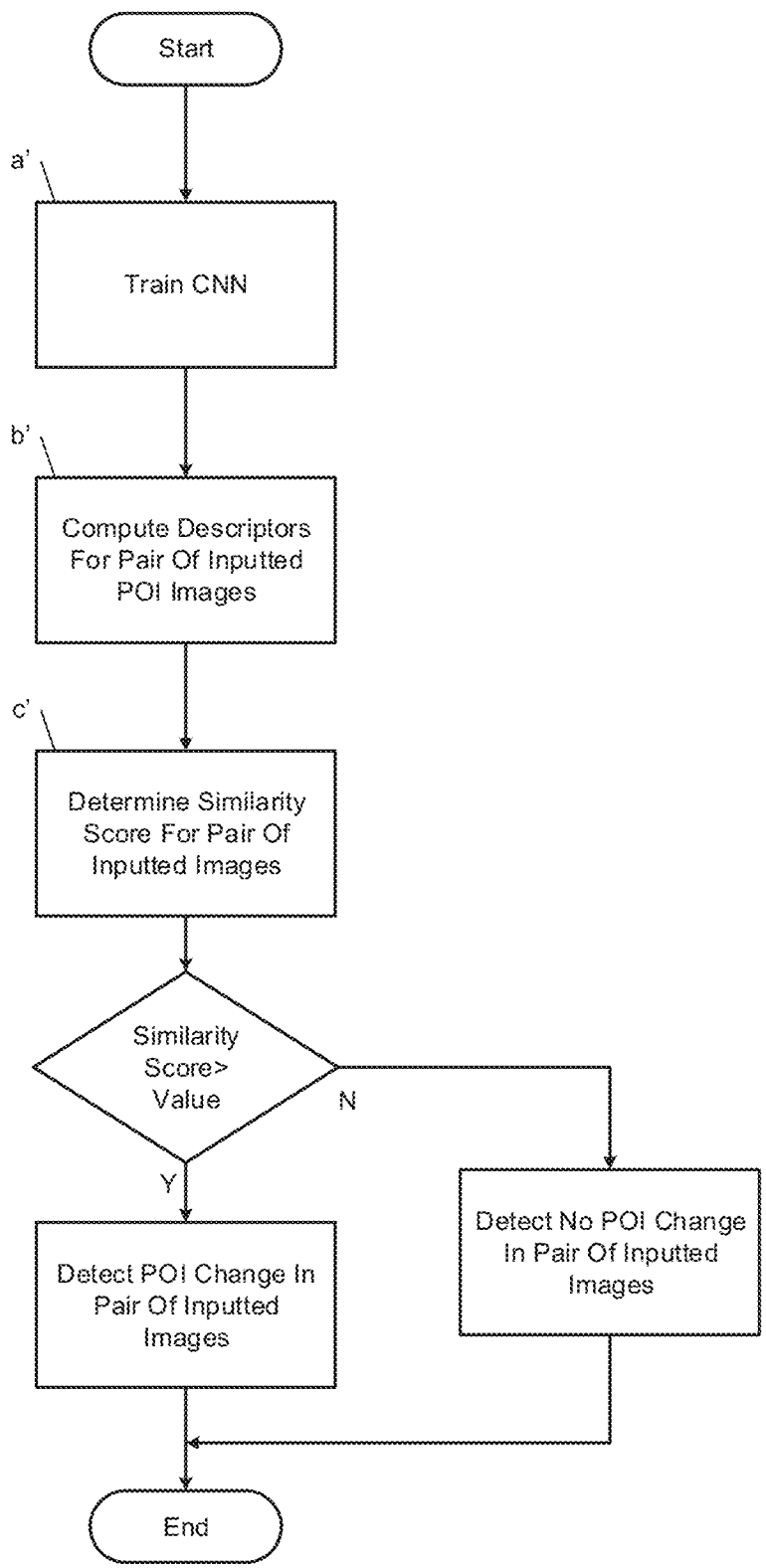
FIG. 10 includes a flowchart depicting an example method of detecting a POI change.

A method for detecting a POI change in a pair of inputted POI images may be executed by the data processor unit 11*c* of the second server 1*b* and is illustrated in FIG. 10. This method includes the comparison of the inputted POI images using the trained CNN so as to determine whether a POI change has occurred.

The images of a pair of inputted POI images may have been captured at the same location at two different time stamps. The method may be performed for a plurality of pair of inputted images, obtained from two given datasets of geolocated images (images taken at the same geolocations) captured at two different time stamps (the "Before-dataset" and the "After-dataset") over a given area. Datasets of images of the surroundings in a specific area may be captured on a regular basis, for example using the image acquisition device 3 every X number of days, weeks, months, or years.

Image pairs are formed according to the image geo-localized meta-data. Specifically, two images $I_a$ and $I_b$ are paired if at least one of them is a close-up picture (e.g., average distance to the corridor outline is below a threshold $\gamma_{dis}$) and their visibility IoU is sufficient: $0(I_a; I_b) > \gamma_{IoU}$ see before how to compute the geometric overlap. The following example values or other suitable values could be used $\gamma_{dis}=8$ meters and $\gamma_{IoU}=0.5$.

At a first step (a'), the training of a CNN of the three-stream Siamese type is performed by the second server 1*b*. The training is consistent with the method described above with reference to FIG. 9. The Siamese NN is trained based of triplets of POI images comprising a pair of related POI images, and a pair of unrelated POI images.

Either the second and the third server 1*b* and 1*c* could be the same equipment, or step (a') could include the transmission of the trained CNN parameters and weights from the second server 1*b* to the third server 1*c*, for storage in the memory 12*c*.

At a second step (b'), the data processor 11*b* of the second server 1*b* uses the trained CNN for evaluation of the inputted images.

To this end, step (b') includes, for each image of the pair of inputted POI images, computing of a descriptor of the image using a stream of the CNN. Only a single stream of the Siamese NN may be used to compute the image descriptor, as all three streams are identical, as described above with reference to FIG. 3. In various implementations, two streams may be used so as to compute the two descriptors in parallel.

In a third step (c'), a POI change can be detected based on a similarity score function of the descriptors computed for the two images. The similarity score represents a distance between the two descriptors. The chance of a POI change occurring increases as the similarity score increases and vice versa.

In a first embodiment, the similarity score is compared with a predetermined threshold to determine a final result indicative of whether a POI change has occurred. For example, a POI change may be detected when the similarity score is greater than the predetermined threshold (inputted POI images are different), and a POI change may not be detected when the similarity score is less than the predetermined threshold (inputted POI images are similar).

In a second embodiment, a loss function such as a sigmoid function can be applied to determine change probabilities instead of binary labels.

The similarity score may be given by the function $S(I_a; I_b) = \langle d_a, d_b \rangle$, i.e. as the dot-product between their descriptors. Other scoring functions are possible, such as norms of the difference.

The method may be performed for all of the POIs over an area, so that spatial aggregation can be used. Each corridor outline w∈W receives a POI change score $S_W$, computed as the maximum of scores for all image pairs "seeing" it:

$$S_w = \max_{I_a, I_b | w \in V_a \cap V_b} S(I_a; I_b)$$

Finally, corridor outlines scores $\{S_W\}$ are locally smoothed along the corridor outlines using a 1D Gaussian kernel of width, for example $\sigma_{sm}=2$ meters or another suitable value.

In various implementations, POI changes detected over the given area are ranked by likelihood. An alert for manual review of the changes could be generated (e.g., displayed) before correspondingly updating the POI database.

The proposed approach can review a large number of images (e.g., thousands), filter the images, and provide for manual review a summary of what is likely showing a POI change. This may reduce the time and resource consumption associated with manual review and verification and improve operation reliability.

The result obtained can be provided to the equipment 10. Using an interactive graphical user interface (GUI), the user can click on the likely POI change areas to quickly view the image pairs at each location and verify whether a POI change has or has not occurred.

Tests

The efficiency of the present method could be evaluated using the standard mean-Average-Precision metric (mAP). mAP is a way of evaluating an instance retrieval system.

Measuring mAP may not exactly align with the POI change detection task where an objective may be to globally rank all locations in a given area in terms of POI change likelihood.

A geographic ground-truth could be defined by manually associating a location to each ground-truth POI change. At test time, the output of the proposed system (generating a value indicative of a likelihood of occurrence of a POI change at each location) could be compared to the geographic ground-truth. All locations close to a ground-truth spot where a POI change occurred are labeled as "positive" (5 meters radius), while all other locations are marked as "negative" (indicating that a POI change did not occur). Overall, less than 0.75% of all locations may be marked as positive. The Average-Precision given this geographic labeling is referred to it as "PCD AP" and reflects the global performance of the proposed system.

Figure 7A:
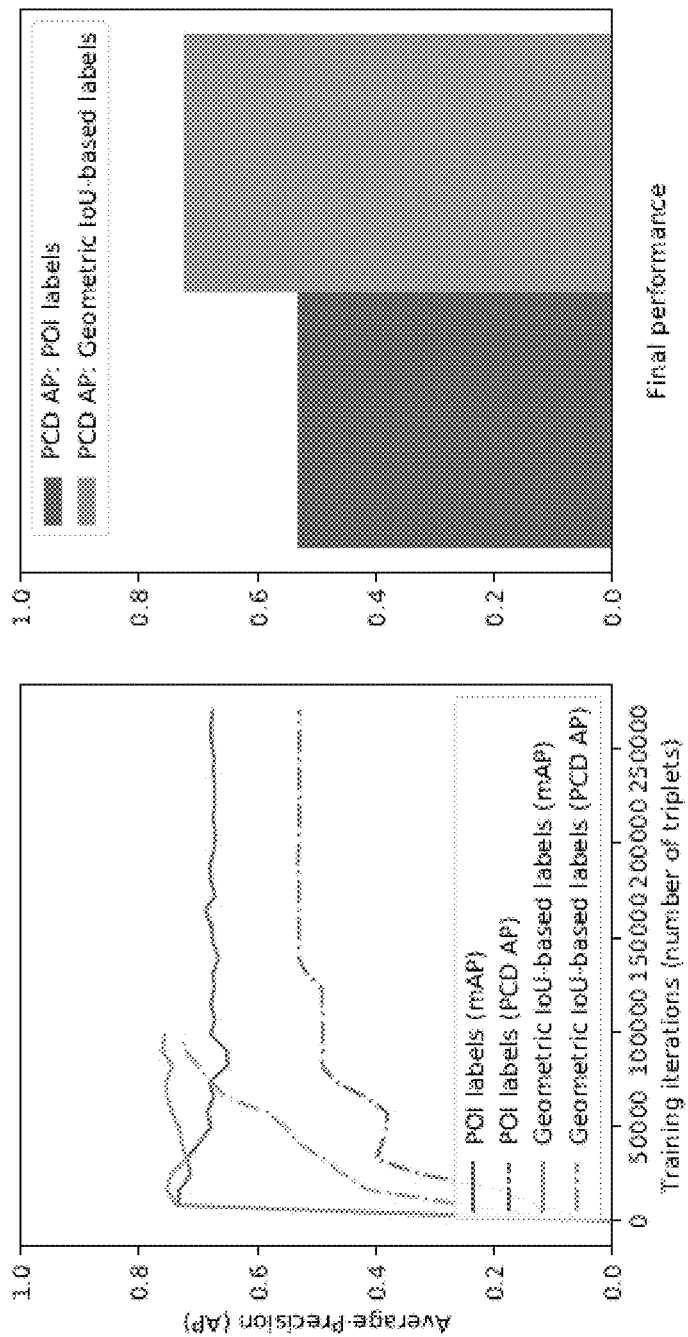
FIGS. 7a-7b represents two tests for assessing the performance of the methods.

FIG. 7a represents a first test comparing the performances of the two labelling schemes described above (labels identifying the POI vs. labels defining position and/or orientation of the image). As illustrated, labeling defining position and/or orientation may perform better.

Figure 7B:
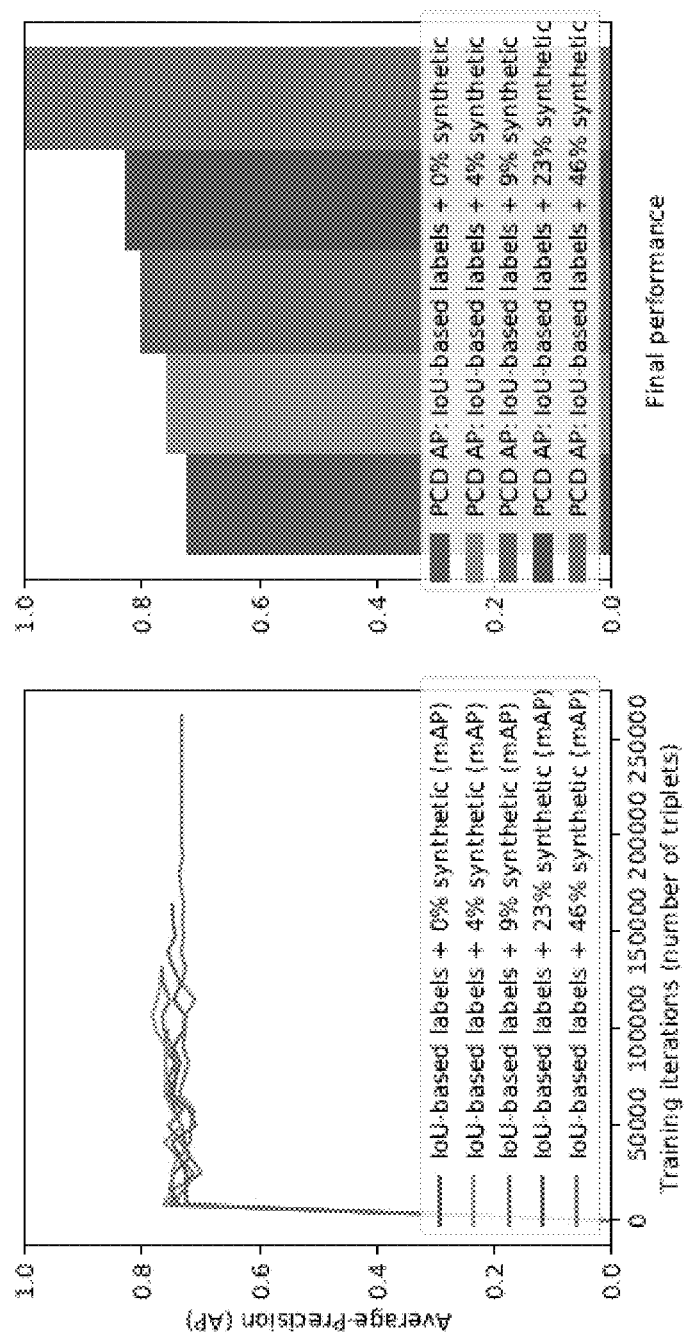

FIG. 7b represents a second test comparing the performances according to different proportions of synthetic images in the training base.

Adding synthetic images makes the training harder and thus last longer, as illustrated by the traces of the left plot. Adding synthetic images, however, has only a minor effect on the mAP. In other words, adding synthetic images has very little or no influence on the ranking of images.

However, synthetic images have a great influence on the PCD AP metric (the more, the better). This is because adding synthetic examples forces the CNN to focus its attention on the only visual feature that is differentiative: the signage. Activation maps of the last convolutional layer after training shows that the CNN learns to focus its attention solely on the signage. As a result, it strengthens the distance gap between images with different signage and therefore makes POI change detection more accurate.

As an example, the distance between the two images $I_a$ and $I_b$ shown in FIG. 4a is equal to $\|d_a-d_b\|\approx 1.23$ and $\|d_a-d_b\|\approx 0.74$ for a CNN trained with and without adding synthetic images, respectively.

Computer Program Product

In various implementations, the present application includes a computer program product comprising code instructions to execute (particularly on the data processor 11a, 11b, 11c of the first, second, and/or third server 1a, 1b, 1c) at least one of: the method for generating a base of training images discussed above; the method of training the convolutional neural network CNN discussed above; and the method for detecting a point of interest (POI) change in a pair of inputted POI images discussed above. The computer program product may be stored on a storage means (e.g., memory 12a, 12b, 12c) that is readable and executable by computer equipment (e.g., at least one of the first, second, and third server 1a, 1b, 1c).

Conclusion

Although the subject matter has been described with a specific reference to POIs that identify store fronts, with its key visual feature identified as "signage", it will be understood that the subject matter defined in the appended claims is not necessarily limited to the specific features or acts described above. Rather, the specific features and acts described above provide one example form. For example, instead of store fronts, POIs may identify a museum and the key visual features (or signage region) of such POIs may be art within the museum.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term processor, as used herein, includes functionality of servers with data processors/memory, and processor circuits. The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for detecting a point of interest (POI) change in a pair of inputted POI images, the method comprising:
   by a first processor, receiving a convolutional neural network (CNN) of three-stream Siamese type trained on triplets of training POI images using a second processor;
   by the first processor, computing, for each image of the pair of inputted POI images, a descriptor of that image using a stream of the CNN of three-stream Siamese type;
   by the first processor, computing a similarity score based on the descriptors of the images of the pair of inputted POI images using a similarity score function; and
   by the first processor, selectively detecting the POI change based on the similarity score.

2. The method of claim 1 wherein selectively detecting the POI change includes, by the first processor, detecting the POI change when the similarity score is greater than a threshold value.

3. The method of claim 2 wherein selectively detecting the POI change includes, by the first processor, not detecting the POI change when the similarity score is less than the threshold value.

4. The method of claim 1 wherein the images of a pair of inputted POI images are captured at the same location at two different times.

5. The method of claim 1 wherein the training a CNN of three-stream Siamese type based on triplets of training POI images further comprises:
- by a third processor, generating a base of training POI images;
- by the second processor, generating a plurality of triplets of training POI images using the base of training POI images, each triplet comprising a first training POI image, a second training POI image that is related to the first training POI image, and a third POI training image that is unrelated to the first and second training POI images;
- by the second processor, determining whether training POI images are related or unrelated based on labels associated with the training POI images, respectively; and
- by the second processor, training a CNN of three-stream Siamese type based on the triplets of training POI images.

6. The method of claim 5 wherein the labels each include a 6-degrees-of-freedom pose of the associated training POI image.

7. The method of claim 6 wherein determining whether the training POI images are related or unrelated includes:
- by the second processor, determining that two training POI images are related when the two training POI images present a geometric overlap greater than a third threshold value; and
- by the second processor, determining that the two training POI images are unrelated when the geometric overlap is less than a second threshold value.

8. The method of claim 7 further comprising, by the second processor, computing the geometric overlap between the two training POI images based on the intersection-over-union between sets of corridor outlines respectively visible in each of the two POI images.

9. The method of claim 5 wherein at least one triplet includes a synthetic POI image generated by replacing a first signage region of a first training image with a second signage region from another training POI image.

10. The method of claim 5 wherein the generating a base of training POI images further comprises:
- by the third processor, obtaining an initial set of POI images having associated labels, respectively;
- by the third processor, for each POI image in a subset of the initial set, identifying a signage region in that POI image, the signage region including signage located on a POI depicted by the POI image;
- by the third processor, generating a synthetic POI image corresponding to a first POI image of the subset by replacing the signage region of the first POI image with the signage region of a second POI image;
- by the third processor, associating to the synthetic POI image the label of the second POI image; and
- storing, as the base of training POI images, a final set of POI images comprising the initial set of POI images and the synthetic POI image.

11. The method of claim 10 further comprising:
- by the third processor, generating a second synthetic POI image corresponding to a third POI image of the subset by replacing the signage region of the third POI image with the signage region of a fourth POI image; and
- by the third processor, associating to the synthetic POI image the label of the fourth POI image, wherein the storing further includes storing the second synthetic POI image in the final set.

12. The method of claim 11 wherein at least 5 percent of a total number of POI images in the final set are synthetic POI images generated with signage regions from other POI images.

13. The method of claim 11 wherein at least 25 percent of a total number of POI images in the final set are synthetic POI images generated with signage regions from other POI images.

14. A method according to claim 10 further comprising:
- obtaining a collection of cropped signage images,
- wherein generating the synthetic POI image includes replacing the signage region of the first POI image with the cropped signage image of a chosen one of the cropped signage images from the collection of cropped signage images.

15. The method of claim 14 further comprising randomly choosing the chosen one of the cropped signage images from the collection of cropped signage images.

16. The method of claim 15 further comprising performing affine warping of the chosen one of the cropped signage images for adaptation to size and shape of the signage region of the first POI image.

17. The method of claim 16 further comprising performing Poisson blending.

18. The method of claim 10 wherein the signage includes at least one of (a) a name located on the POI depicted by the POI image and (b) a logo located on the POI depicted by the POI image.

19. The method of claim 18 wherein identifying the signage region in each of the POI image includes identifying the signage region in each of the POI images using at least one of optical character recognition and logo detection.

20. The method of claim 10 wherein the labels associated with the POI images each include a label identifying the POI depicted by that one of the POI images.

21. The method of claim 10 wherein the labels associated with the POI images each include a label defining at least one of a position and an orientation of that one of the POI images.

22. The method of claim 10 wherein the labels associated with the POI images each include a label defining a 6-degrees-of-freedom pose of that one of the POI images.

23. The method of claim 10 further comprising generating the initial set of POI images by acquiring geo-localized images of POIs using an image acquisition device.

24. The method of claim 10 wherein the subset includes all of the initial set.

25. A method for generating a base of training images for training a convolutional neural network (CNN) for detecting a point of interest (POI) change in a pair of inputted POI images, the method comprising:
- by a processor, obtaining an initial set of POI images having associated labels, respectively;
- by the processor, for each POI image in a subset of the initial set, identifying a signage region in that POI image, the signage region including signage located on a POI depicted by the POI image;
- by the processor, generating a synthetic POI image corresponding to a first POI image of the subset by replacing the signage region of the first POI image with the signage region of a second POI image;
- by the processor, associating to the synthetic POI image the label of the second POI image; and storing, as the base of training images, a final set of POI images comprising the initial set of POI images and the synthetic POI image.

26. A method for training a convolutional neural network (CNN) for detecting a point of interest (POI) change in a pair of inputted POI images, the method comprising:
- by a first processor, generating a base of training POI images;
- by a second processor, generating a plurality of triplets of training POI images, each triplet comprising a first POI image, a second POI image that is related to the first POI image, and a third POI image that is unrelated to the first and second POI images;
- by the second processor, determining whether POI images are related or unrelated based on labels associated with the POI images, respectively; and
- by the second processor, training a CNN of three-stream Siamese type based on the triplets of training POI images.

27. A method for detecting a point of interest (POI) change in a pair of inputted POI images, the method comprising:
- by a first processor, training a convolutional neural network (CNN) of three-stream Siamese type based on triplets of training POI images;
- by a second processor, computing, for each image of the pair of inputted POI images, a descriptor of that image using a stream of the CNN of three-stream Siamese type;
- by the second processor, computing a similarity score based on the descriptors of the images of the pair of inputted POI images using a similarity score function; and
- by the second processor, selectively detecting the POI change based on the similarity score.

* * * * *